United States Patent [19]

Coleman, Jr.

[11] 4,399,474

[45] Aug. 16, 1983

[54] AUTOMATIC THRESHOLD TRACKING SYSTEM

[75] Inventor: Charles H. Coleman, Jr., Redwood City, Calif.

[73] Assignee: Ampex Corporation, Redwood City, Calif.

[21] Appl. No.: 292,657

[22] Filed: Aug. 10, 1981

[51] Int. Cl.³ .............................. G11B 5/09; G11B 5/02
[52] U.S. Cl. ........................................ 360/46; 360/67
[58] Field of Search ....................... 360/40, 39, 46, 67

[56] References Cited

U.S. PATENT DOCUMENTS

| | | | |
|---|---|---|---|
| 3,478,255 | 11/1969 | Parker et al. | 360/40 |
| 3,593,334 | 7/1971 | Bickel | 360/40 |
| 3,735,372 | 5/1973 | Coccagna | 360/40 |
| 4,219,152 | 8/1980 | Couch et al. | 360/40 |

OTHER PUBLICATIONS

K. Yokoyama, et al, "An Experimental Digital Videotape Recorder", *SMPTE Journal*, vol. 89, Mar. 1980, pp. 173–180.
Peter Kabal, et al, "Partial-Response Signaling", *IEEE Transactions on Communications*, vol. Com-23, No. 9, Sep. 1975.
H. Kobayashi, et al, "Application of Partial-Response Channel Coding to Magnetic Recording Systems", *IBM J. Res. Develop.*, Jul. 1970, pp. 368–375.

*Primary Examiner*—Vincent P. Canney
*Attorney, Agent, or Firm*—Elizabeth E. Strnad; Joel D. Talcott; John Flannery

[57] ABSTRACT

A magnetic recorder including a playback circuit for decoding a ternary waveform digital data signal is disclosed, wherein positive and negative threshold levels, used to distinguish between signal levels representative of data ones from signal levels representative of data zeros, are automatically adjusted to compensate for occasional reductions in overall signal level that can occur due to dropouts and modulation noise on the magnetic medium. Two sample and hold units are used to generate an output signal whose amplitude reflects only those signal levels that are greater than some minimum absolute value. This output signal is filtered and then used to generate the compensated positive and negative threshold levels.

11 Claims, 4 Drawing Figures

AUTOMATIC THRESHOLD TRACKING SYSTEM

The invention described herein was made in the course of Contract No. F33657-81-C-1032 awarded by the U.S. Government.

The present invention relates to circuits for decoding partial-response coded ternary waveform digital data signals, and more particularly, to a magnetic recorded playback system wherein the threshold levels used to distingish between ones and zeros in the signal are adjusted automatically to track the level of the data signal, thereby compensating for any drop below normal in the overall signal level.

Many different techniques have been developed in the art for narrowing the necessary bandwidth needed by a signal, improving the signal-to-noise ratio response of a circuit and, in magnetic recording systems, maximizing of data packing density. One method that has been used with success involves the partial-response coding of the digital data, a method which can provide improvements in all of the above described areas. A general survey of various partial-response signalling schemes is disclosed in Kabal and Pasupathy, "Partial-Response Signalling", IEEE Transactions on Communications, Vol. COM-23, No. 9, Sept. 1975. An article that was first to describe the use of partial-response coding in magnetic recording systems is the article by Kobayashi and Tang, "Application of Partial-Response Channel Coding to Magnetic Recording Systems", IBM J. Res. & Devel., July 1970.

In a magnetic recorder, the advantage of partial-response signalling is that if the frequency response of the spectrum of noise is plotted with respect to the response characteristic of the partial-response signal, it can be seen that for certain partial-response functions, especially the Class IV type defined in the Kabal article, the signal response is substantially the inverse of the noise spectrum, so that significant signal-to-noise reduction is enabled if the partial-response is matched to the noise spectrum. Class IV partial-response coding also is DC free during tape playback, i.e., the signals are AC coupled. Thus, the signal is automatically centered on zero volts.

One of the inherent drawbacks of using partial-response coding is that instead of the data at the point of decoding being in binary form, i.e., digital "1's" and "0's", a Class IV partial-response signal involves signals having three levels (ternary waveform signals).

Another more significant problem with partial-response coding systems is that the partial-response signal is vulnerable to rapid variations in signal level, as can occur, for example, due to dropouts and modulation noise generated by a magnetic tape. These variations momentarily offset the signal waveform such that when the signal is decoded, usually by detecting whether or not the signal is above or below a specific threshold level, unnecessary decoding errors can be made.

More specifically, a Class IV partial-response signalling system conventionally comprises, at the point of decoding, a three level signal, either +1, 0, or −1, with all of the binary zeroes from the original message being in the middle or zero level of the partial-response signal and the plus or minus one levels corresponding to a digital "1". Thus, to decode this signal back into a binary signal, two slicers or comparators are needed, a first comparator having reference to a positive threshold level for differentiating between a "1 level and 0 level and a second comparator referenced to a negative threshold level for differentiating between a −1 and a 0. In a magnetic recorder system, generally a binary NRZ signal is digitally precoded prior to recording, then shaped by analog means upon playback into a ternary waveform which is thereafter coupled simultaneously to two such comparators, which operate to detect, respectively, either the +1, 0, or −1 signal levels at a specific sample time once per data bit period, and whose outputs are logically combined to reconstruct the original binary message. The above mentioned analog shaping means is a truncated sine function in frequency and employs the subtraction of a delayed version of the signal from its undelayed form, allowed by a band-limiting low pass filter. As typically utilized in magnetic recording systems, the precoded binary waveform is saturation recorded, and the linear sine-function shaping is used in playback to improve the signal-to-noise ratio prior to decoding of the data.

The comparators used for decoding have fixed reference voltages normally applied to them, which determine their threshold levels. These thresholds are usually set at points mid-way between the center level and the outer levels (both upper and lower) as seen in a conventional ternary eye pattern, as described in the Kabal, et al. article, supra. The latching time (effective sampling time, or instant of decision) is adjusted to occur at the moment the signal voltage crosses the foci of the eye pattern. This is the instant when the signal voltage, if noise-free and unmodulated, should be found at one of three specific levels, the center level indicating a message "0" and either of the outer levels indicating a "1". With the threshold levels fixed at a level half way between these points, a maximum amount of noise voltage may be added before detection errors are made.

When a partial dropout occurs, due to a defect in the tape, the signal reduces in peak-to-peak amplitude about the center level for a duration of some number of data bits. The "1" levels are therefore displaced, while the "0" level is not, since the signal is AC coupled. With fixed thresholds, a reduction in signal amplitude to half or less of normal will cause a "1" to be erroneously detected as a "0", even in the absence of additive noise. With the inevitable additive electronic noise present, errors may occur even with lesser signal reductions. These errors become even more pronounced at higher data packing densities.

If the threshold voltages could be made to automatically vary in accordance with signal amplitude so that they always maintained their position mid-way between the signal levels that would exist in the absence of additive noise, then decoding could continue in spite of reductions in partial-response signal amplitude so long as the reduced signal-to-additive noise ratio was still adequate. Since shallow droputs, or ones in which the signal drops only a few dB, occur much more frequently than deep ones, many errors could be thus avoided. In systems having very high packing densities such dropouts also occur fairly slowly relative thereto and at a fairly constant rate of signal amplitude loss.

Therefore, an object of the present invention is to provide a means for causing threshold levels used for decoding partial-response coded signals to vary in proportion to and substantially simultaneously with variations in overall level of a partial-response signal, thereby enabling these threshold levels to maintain an optimum level with respect to the partial-response signal, so that errors in detecting correct signal levels are minimized during such signal level variations.

Another object of the present invention is to compensate for a dropout or other noise occurrence in a partial-response signal, wherein the threshold reference levels are modified as a function of the extent of the detected dropout.

Yet another object of the present invention is to provide a partial-response signalling scheme enabling a higher data packing density on a magnetic recording medium.

Yet another object of the present invention is to provide a means for adjusting threshold levels as the function of a fractional component of a previously detected digital "1" level such that a threshold level adjustment that reduces the threshold level down to as low as the level of noise is enabled.

These other objects and advantages of the present invention will become more apparent on reference to the following description and accompanying drawings in which.

Generally, the present invention is directed to a system for automatically causing positive and negative threshold levels, used to decode a three-level partial-response coded signal, to track variations in the overall amplitude of the partial-response signal. The circuit includes sample and hold means for generating and maintaining an output signal whose amplitude is equal to the absolute value of the present level of said partial-response signal at a specified clock time, when said signal level is at least a predetermined fraction of the level of a previously generated and maintained output signal. Also included are means for generating the positive and negative threshold signals as a function of the present level of this output signal.

More specifically, in a magnetic recorder system, a playback circuit for decoding a partial response digital data signal having three levels (a ternary waveform) includes a clock extraction means for periodically generating a clock pulse whenever the level of said data signal is representative of data to be sampled, a first means responsive to each clock pulse for sampling, holding, and outputting a first output signal whose level represents the present level of the data signal, second means for sampling, holding, and outputting a second output signal representing the present level of the first output signal whenever the first output signal amplitude is at least equal to an amplitude that is a predetermined fraction of the level of the presently held second output signal, low pass filter means for smoothing amplitude variations in successive second output signals, and means for generating a positive and negative threshold level whose amplitudes are a function of said smoothed second output signals, but are of opposite polarity, each said polarity corresponding respectively to the polarity of one of the two outer levels of said digital data signal. Means are provided for comparing the data signals with these positive and negative threshold levels and for generating in response to each clock pulse an output digital data "1" whenever said data signal level exceeds positively the positive threshold level or exceeds negatively the negative threshold level, and for generating a digital data "0" whenever the data signal is of a lower absolute magnitude than either of the threshold levels.

The invention herein may be defined in terms of both an apparatus and a method. Although the present invention is preferrably usable for reducing noise in a playback signal from a magnetic recording medium, it will be apparent to those skilled in the art that the invention is applicable in connection with various other types of partial-response signal decoding systems, and devices other than magnetic recorders.

Figure 1:
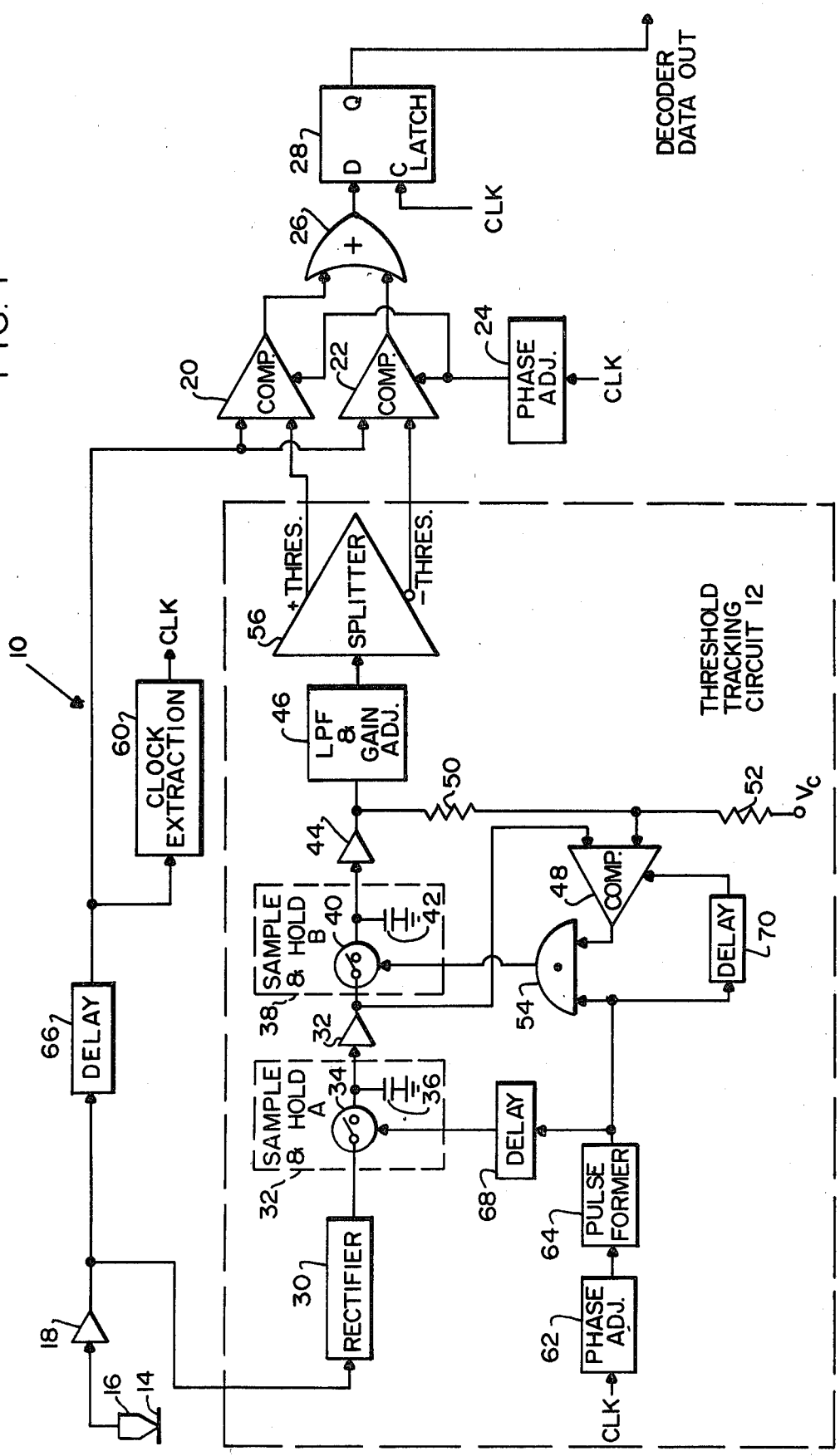
FIG. 1 is a block diagram of a partial-response decoding system including a threshold tracking circuit according to the present invention.

Referring now to FIG. 1, shown at 10 is a circuit for decoding partial-response signals including a threshold tracking circuit 12. In a simple system, the partial-response signals may be obtained directly off of a magnetic recording medium 14 via a magnetic read head 16. This is because the reproducing process employing conventional inductive heads involves a differentiation in the signal waveform. The signal from read head 16 may therefore be fed to a decoder 10 simply through a conventional amplifier 18. Although the system shown in FIG. 1 discloses a simple type of partial-response generation, further filtering, not shown, would be required to obtain Class IV response.

As described above, prior art partial-response signal decoding systems have conventionally used two comparator circuits 20 and 22 to which the partial-response signal is fed, for comparison with corresponding threshold reference levels, which are coupled to the other input of each of the comparators. A fixed positive threshold level may be coupled to comparator 20, and a fixed negative threshold coupled to comparator 22, such that when comparators 20, 22 are clocked by a clock pulse CLK through a phase adjust circuit 24, if the partial response signal at that time is greater than the positive threshold reference level, comparator 20 is actuated, whereas if the partial-response signal is below the negative threshold reference level, comparator 22 is actuated. In a third case, where the partial-response signal is neither greater than the positive threshold reference, nor below the negative threshold reference, neither comparator 20 nor 22 are actuated at the CLK clock time. OR gate 26 acts to output a positive level whenever either comparator 20 or comparator 22 outputs a signal, such that the output of OR gate 26 is a digital "1" signal whenever the partial-response signal is either higher than the positive threshold reference level or lower than the negative threshold reference level, and is a digital "0" signal level for all other levels of the partial-response signal. Consequently, the output of OR gate 26 constitutes the reconstituted two level digital signal. To retain the present binary level output by OR gate 26 until the next CLK clock time, a conventional latch 28 is fed by OR gate 26 and actuated by the CLK pulse or some similar pulse, such that the output Q of latch 28 constitutes the binary digital data output of the decoder 10.

In the present invention, a measurement is made of the present level of positive and negative "1"s in the partial-response signal. The voltage derived from this measurement is low pass filtered and, after suitable adjustment is made to its magnitude, is used directly as the positive and negative threshold reference levels for comparators 20 and 22.

Figure 2:
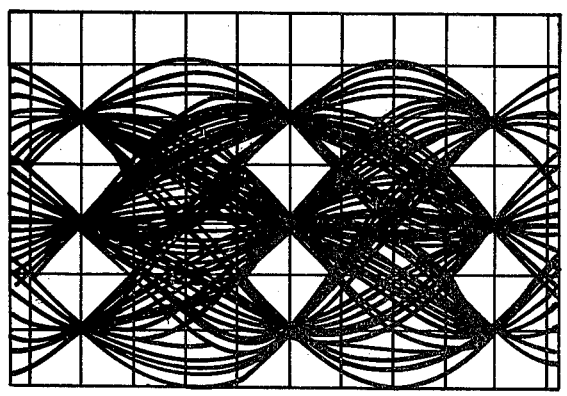
FIGS. 2A and 2B illustrate a Class IV partial-response eye pattern and a full-wave rectified eye pattern.
Figure 2:
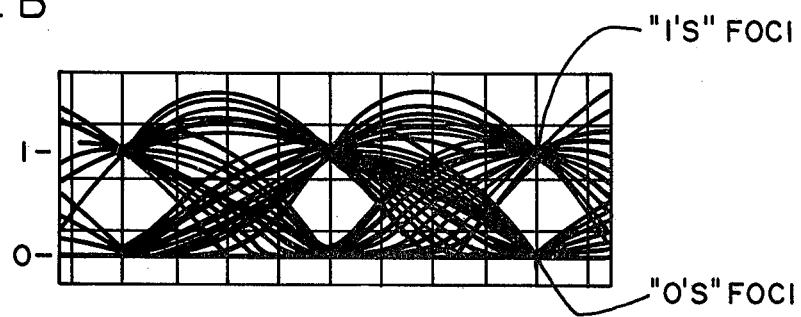

Referring now specifically to the threshold tracking circuit 12 of FIG. 1, the first step in detecting variation in the overall level of partial-response signal amplitude is to full-wave rectify the input partial response signal by means of a rectifier 10. The operation of rectifier 30 is illustrated in the eye pattern diagram of FIG. 2A and the rectified eye pattern shown in FIG. 2B. As can be seen in FIG. 2, since the Class IV partial-response signal is an AC coupled signal, the center level of the three level signal is always at zero. The rectified or "folded" waveform of FIG. 2B shows that there now is a single eye opening at each sample time, wherein the eye has two foci, one of which, at the zero level, represents data "0's" and the other indicating data "1's". Therefore, by full-wave rectifying the signal, all the signal amplitudes are converted into their absolute value, and at the sampling times are a function of the peak-to-peak amplitude of the incoming signal plus the effects of noise. That is, no matter whether the signal level was a positive going or a negative going level, all levels are now going in a single polarity direction with respect to the center level.

The output of rectifier 30 is fed to a conventional sample and hold unit A shown at 32, which includes a sampler switch 34 controlled by an external clock input and a voltage holding means comprising a capacitor 36. The output of sample and hold unit 32 is fed through a buffer amplitude 38 to a second sample and hold unit B shown at 38. Sample and hold unit B includes the same components as sample and hold unit A, including a sampler switch 40 and voltage holding means comprising a capacitor 42. The output of sample and hold unit B is fed through a second buffer amplifier 44 to a low pass filter and gain adjust circuit 46 and also to a comparator 48 via a voltage dividing resistor network. This network comprises the resistors 50 and 52. Resistors 50 and 52 act to couple a predetermined fraction of the present level held by the sample and hold unit B to one input of comparator 48. As seen in FIG. 1, the other input of comparator 48 is fed from the output signal of the first sample and hold unit A. As can be seen, comparator 48 acts, when clocked, to output a signal whenever the output signal of sample and hold unit A exceeds the fractional component of the output signal of sample and hold unit B, wherein the fraction is defined by the values of resistors 50 and 52. Note that resistor 52 is coupled at its other side to a voltage $V_C$. This voltage is the voltage of the center level of the partial response signal, which is equal to zero volts, as mentioned above, for a Class IV partial-response signal.

The output of comparator 48 feeds an AND gate 54, whose other input terminal is connected to a clock pulse. AND gate 54 acts to actuate sample and hold unit B, thereby causing sample and hold unit B to sample the signal presently held in sample and hold unit A, whenever the output of comparator 48 indicates that the signal out of sample and hold unit A exceeds the fractional component of the present output of sample and hold unit B. The purpose of the above described circuit is to cause sample and hold unit B to sample the output of sample and hold unit A only when this latter unit's signal output is indicative of a digital "1" level rather than a digital "0" level. The reason for this is that the output of sample and hold unit B is designed to follow variations in the level of the extremes of the partial-response signal when data "1's" are being detected. Consequently, the output of sample and hold unit B is a voltage level whose amplitude follows substantially simultaneously the amplitude of changes in the level of such digital "1's" in the partial-response signal.

In the preferred embodiment, the fractional amount of the second sample and hold unit output is equal to one half. Thus, if the first sample and hold unit's output voltage level is smaller than one half of the level of the present second sample and hold unit output signal, then the circuit assumes that a "0" had been sent, and the sampling pulse for the second sample and hold unit is inhibited via AND gate 54. Due to the fact that dropouts rarely, if ever, exhibit an instantaneous change of signal level (a 6 dB change in 100 bits is representative where there is a moderately high linear data packing density), this circuit can track any changes in the level of data "1's" that occur during most of not all of these dropouts.

As mentioned above, the output of sample and hold unit B is fed through a buffer amplifier 44 to a low pass filter and gain adjust circuit 46. The low pass filter operates to smooth the output of the sample and hold unit B. This is needed to eliminate, as much as possible, the effect of jitter and other effects caused by noise. The choice of bandwidth of the low pass filter is a compromise between a filter that reduces the effects of additive noise, favoring a narrow bandwidth, and a filter having the ability to follow the fastest changing signal variations expected, favoring a wider bandwidth. Experimentally, a filter whose response time corresponds to about 20 bit periods was found to be suitable. Use of a linear phase design in the filter, with a matching delay in the signal path, has the advantage that smoothing of the amplitude measurement takes place symmetrically with time, with sample values taken both before and after the present instant being given equal weight in the integration process.

The gain adjust portion of the circuit 46 is merely to provide a means for insuring that the output of the threshold tracking circuit 12 reflects the actual threshold reference magnitude needed by comparators 20 and 22 to properly operate on the partial-response signals input thereto. Splitter 56 operates to split the output of the low pass filter and gain adjust circuit 46 to create both a positive and a negative threshold voltage level for input respectively to comparators 20 and 22.

Generation of the CLK and other clock pulses required for the proper operation of the threshold tracking circuit 12 according to the present invention are conventional to one of ordinary skill in the art. In the embodiment shown in FIG. 1, the CLK clock pulse is generated by a clock extraction circuit 60. A CLK pulse is generated once every bit period and generates the timing necessary to sample the partial-response waveform at desired sample times. In a partial-response system, the sample times are defined to be at the eye pattern foci, i.e., in the middle of the opening of the eye. As mentioned above, a sample eye pattern is illustrated in FIG. 2A.

A conventional clock extraction circuit 60 may include a free running oscillator locked through a phase-locked loop to a clock frequency component derived from the signal. To time the sample and hold unit A, to insure that the sample is taken precisely at the foci or crossing time of the eye, a phase adjust circuit 62 is provided. This is because the CLK signal frequency is obtainable from the input partial-response signal but the relative phase is not known. In operation, phase adjust 62 includes a manual adjustment that is used to calibrate the system to insure that the clock fed to sample and hold unit A occurs precisely at the eye crossing time. The output of phase adjust 62 is fed to a pulse former 64 which merely insures that the clock pulse is formed as a relatively narrow sampling pulse.

Various delay circuits, shown at 66, 68 and 70 are also provided, and are used to insure that all of the actions of the threshold tracking circuit 12 occur at a proper time in the right relationship to the other components of the circuit, compensating for any circuit delays therein.

Specifically, delay 68 is needed to establish the proper relationship between the sampling times of sample and hold units A and B. Similarly, delay 70 is required to delay the clock to comparator 48, to establish the proper relationship between the sampling time of sample and hold unit B and the latching (decision) time of comparator 48. Sample and hold unit B must take its sample of A's output late in A's holding time, shortly before it takes its next sample of the signal. Comparator 48 must make its decision while both A and B are holding their respective sample values, and sufficiently in advance of B's next sample time in order to inhibit it through gate 54, taking propagation delays into account.

Delay 66 is used to insure that the partial-response signal coupled to comparators 20 and 22 arrives substantially simultaneously with the adjusted positive and negative threshold levels output by splitter 56. A major problem of circuit delay compensated by delay 66 is the delay generated in the low pass filter 46.

Figure 3:
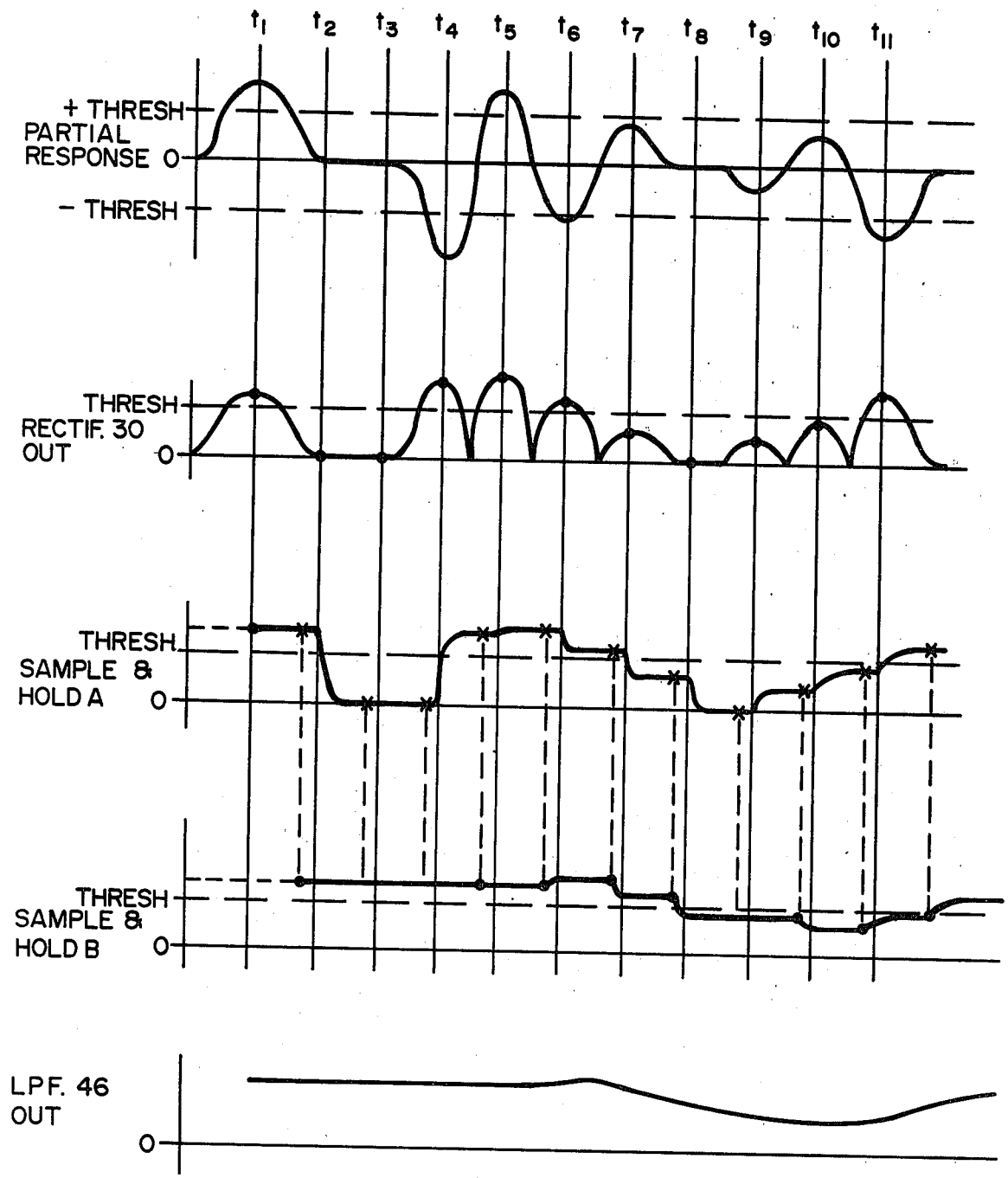
FIG. 3 is a timing diagram illustrating the operation of the threshold tracking circuit shown in FIG. 1.

FIG. 3 is a timing diagram illustrating the operation of the threshold tracking circuit shown in FIG. 1. As seen in FIG. 3, the first curve is an exemplary partial-response signal having three levels, the $+1$, $-1$ and 0 data levels. Again, however, this is a more simplified curve than a Class IV partial-response, wherein the sampling time is often not at the peak of the waveform. Also shown are various clock times $t_1-t_{11}$ which will be used herein to explain various characteristics of the curves in FIG. 3. For illustrative purposes, the partial-response curve shown in FIG. 3 includes exemplary fixed positive and negative threshold levels. As seen in this curve, at time $t_6$ the partial-response signal is only barely extending beyond the negative threshold level, and by time $t_7$, the partial response signal has dropped below the positive threshold level and remains below the positive and negative threshold levels until time $t_{11}$. The present invention is directed towards adjusting the positive and negative threshold levels to adjust for such occurrences, whether they be generated from a dropout or other noise in the signal, in an attempt to save and retain these data "1" pulses that would otherwise be lost.

The second curve in FIG. 3 illustrates the operation of rectifier 30, with the output signal being full-wave rectified, so that it is referenced always in one polarity direction for all "1's" with respect to the middle or 0 level. That is, the absolute values of the partial-response signal are sampled by the threshold tracking circuit for use in adjusting the positive and negative threshold levels, to enable a maximum number of samples to be used.

The operation of sample and hold unit A is shown, and illustrates that the sample and hold unit is timed to sample and hold the present level of the rectifier 30 output signal at each clock time, e.g., at times $t_1-t_{11}$. Thus, as can be seen, at time $t_1$, the sample and hold unit A samples and retains the present level of the rectified partial-response signal. At time $t_2$, it can be seen that the rectifier 30 output is at a 0 level, and so at some subsequent time the output of the sample and hold unit A also corresponds to this 0 level. With the rectifier 30 output signal remaining at a data 0 level at the time $t_3$, the sample and hold unit A output also retains and maintains this value. At times $t_4$, $t_5$ and $t_6$, with the rectified signals all being positive and above the normal threshold level, sample and hold unit A outputs and holds corresponding levels. As can be seen, even at time $t_7$, with rectifier 30 output below the normal threshold level, the sample and hold unit A still will sample and hold this level until the next sample time. In summary, sample and hold unit A samples and retains at each successive clock time the present value of the rectifier 30 output signal until the next sampling time.

The output of sample and hold unit B is shown in the next curve, with the sampling times for this sample and hold unit indicated at the points marked with a small x in the sample and hold unit A curve. This illustrates that the timing of sample and hold unit B sampling occurs at some point in time shortly before the next sampling time, well after the output signal from sample and hold unit A has had an opportunity to rise or fall to the level it has sampled. As is shown, the output signal generated by sample and hold unit B does not vary in response to output signals from sample and hold unit A when these latter signals are below a fractional amount of the present level of sample and hold unit B, as described above. Thus, after sampling time $t_2$, although the sample and hold unit A output signal level has dropped to 0, the sample and hold unit B output signal is retained at the level that it obtained at sampling time $t_1$, since the level of sample and hold unit A at time $t_2$ is below one half of present output signal level of sample and hold unit B. After sampling time $t_4$, however, with the output signal from sample and hold unit A being above the fractional value of the output of sample and hold unit B, this level is reflected in the output of sample and hold unit B, and subsequent levels up to sampling time $t_7$ also are reflected in the output signal generated by the sample and hold unit B.

At sampling time $t_7$, it can be seen that the output of sample and hold unit A has dropped below the normal threshold point for an indication of data "1". This is a dropout condition. Since the signal is not less than half the present level of the output signal of sample and hold unit B, the sample and hold unit B follows this level down below the normal threshold level. However, at sampling time $t_8$, the output of sample and hold unit A again drops to zero, a level which is below 50% of the output of sample and hold unit B, so that this level is not reflected in the output signal of sample and hold unit B. With the dropout beginning to end starting at time $t_9$, the output of sample and hold unit B begins to follow the signal back to a level about the normal threshold level.

Thus, it is clear that the output signal from sample and hold unit B follows the overall variations in the extreme or outermost levels at sampling times of the partial-response signal, and provides a useable indication of amplitude variations occurring due to dropouts and other noise on a magnetic medium. Thus, with proper adjustment of the magnitude of the output of sample and hold unit B, this signal can be used as a threshold level signal to insure that the threshold levels used to decode the partial-response signal also follow any degredation in the overall signal amplitude of the partial-response signal.

The final curve shown in FIG. 3 is the low pass filter 46 output. This circuit acts to smooth and also adjust the magnitude of the output signal from the sample and hold unit B, correcting for jitter and other noise, not shown in FIG. 3, that may also exist in the partial-response signal.

Various alternate embodiments of the present invention should be obvious to one of ordinary skill in the art. For example, although it is preferred that the partial-response signal be rectified in order to obtain the advantage of sampling for every "1" data level, whether it is positive or negative with respect to the center or "0" level, it is also within the scope of the present invention to have a circuit operative only on the positive going or negative going pulses. Of course in the latter case, the number of samples would be reduced by about 50%, thus reducing the accuracy and response time of such a threshold tracking circuit. Another alternative would be to generate the positive and negative threshold levels from two separate threshold tracking circuits. Again, this embodiment would also be less advantageous in that each threshold level would then be generated from only about 50% of the data "1" samples used in the preferred embodiment of FIG. 1.

It is of course understood that although a preferred embodiment of the present invention has been illustrated and described, various modifications, alternatives and equivalents thereof will become apparent to those skilled in the art and, accordingly, the scope of the present invention should be defined only by the appended claims and equivalents thereof.

What is claimed is:

1. In an apparatus for decoding a partial-response signal whose level at a specified clock time represents one digital binary state if the level is more positive than a positive threshold level or more negative than a negative threshold level, and represents another digital binary state if the signal level is between said threshold levels, a system for automatically adjusting said positive and said negative threshold levels in proportion to variations in the overall amplitude of said partial-response signal, comprising:
    sample and hold means for generating an output signal whose amplitude is proportional to the absolute value of the level of said partial-response signal at said specified clock time when the level of the absolute value of said partial-response signal at said clock time is above a predetermined fraction of the absolute value of the level of said partial respone signal from a prior clock time, and for maintaining said output signal at the amplitude generated at a prior clock time when the level of the absolute value of the partial response signal at said specified clock time is below said predetermined fraction of the absolute value of the level of said partial response signal from said prior clock time; and
    means for generating said positive and said negative threshold levels as a function of said output signal.

2. In an apparatus for decoding a ternary waveform signal into a binary signal, wherein an upper level of said ternary waveform signal is defined to be a singal more positive than a positive threshold level, a lower level of said ternary waveform signal is defined to be a signal more negative than a negative threshold level, and a middle level of said ternary waveform signal is defined to be between said positive and negative threshold levels, and wherein at a specified clock time a signal in said upper or lower level represents a first digital state and a signal in said middle level represents a second digital state, a system for automatically adjusting said positive and said negative threshold levels in proportion to variations in the overall amplitude of said upper and lower level signals, comprising:
    sample and hold means for generating an output signal whose amplitude is proportional to the absolute value of the level of said ternary waveform signal at said specified clock time when the level of the absolute value of said partial-response signal at said clock time is above a predetermined fraction of the absolute value of the level of said partial respone signal from a prior clock time and for maintaining said output signal at the amplitude generated at a prior clock time when the level of the absolute value of the partial response signal at said specified clock time is below said predetermined fraction of the absolute value of the level of said partial response signal from said prior clock time; and
    means for generating said positive and said negative threshold levels as a function of said output signal.

3. The system of claim 2 wherein said predetermined fractional level of said output signal is defined to be a level of approximately 50% of said output signal level.

4. In a magnetic recorder, a playback circuit for decoding a ternary waveform digital data signal comprising:
    clock extraction means for periodically generating a clock pulse such that it occurs whenever the level of said data signal is representative of data to be sampled;
    first means responsive to each clock pulse for sampling, holding and outputting as a first output signal the present level of said data signal;
    second means for sampling, holding and outputting as a second output signal the present level of said first output signal whenever said first output signal amplitude is at least equal to an amplitude that is a predetermined fraction of the level of the presently held second output signal; and for holding and outputting said second output signal at the amplitude generated at a prior clock time when the first output signal amplitude is below a predetermined fraction of the level
    low pass filter means for smoothing amplitude variations in successive second output signals; and
    means for generating a positive and a negative threshold level whose amplitudes are a function of said smoothed second output signals, but are of opposite polarity, each said polarity corresponding respectively to the polarity of one of the two outer levels of said digital data signal.

5. The circuit of claim 4 further comprising means for comparing said data signal with said positive and negative threshold levels and for generating in response to each clock pulse an output digital data "1" whenever said data signal level exceeds positively said positive threshold level or exceeds negatively said negative threshold level, and a digital data "0" whenever said data signal is of a lower absolute magnitude than said threshold levels.

6. The circuit of claim 4 further comprising means for delaying the sampling of said first output signal amplitude by said second means for sampling for a period of time after said first means for sampling has been clocked by said clock pulse, to provide time for said first output signal amplitude to stabilize.

7. The circuit of claim 4 wherein said predetermined fractional level of said presently held second output signal is about fifty percent of second output signal.

8. The circuit of claim 4 further comprising rectifier means for rectifying said ternary waveform prior to sampling thereof by said first sampling means.

9. In an apparatus for decoding a partial response digital data signal having three levels, an upper level defined to be a signal more positive than a positive threshold level, a lower level defined to be more negative than a negative threshold level, and a middle level defined to be between said positive and negative threshold levels, and wherein a signal in said upper or lower level at a specified clock time represents a first digital state, a method for adjusting said positive and negative threshold levels in proportion to variations in the overall amplitude of said digital data signal comprising the steps of:

(a) sampling said data signal at a point in time wherein said data signal is representative of either said first digital state or said second digital state;

(b) generating an output signal whose amplitude is proportional to the absolute value of said data signal aplitude whenever said data signal absolute value is at least equal to a predetermined fracton of the level of the output signal previously generated;

(c) maintaining said output signal at the amplitude previously generated when the amplitude of the presently generated output signal is below said predetermined fracton of the level of the output signal previously generated;

(d) generating said positive and negative threshold levels as a function of said output signal; and (e) repeating of steps (a) through (d) for each said representative data signal.

10. The method of claim 9 wherein said fractional level of said previously maintained output signal is equal to about fifty percent of said output signal level.

11. In an apparatus for decoding a partial-response signal whose signal level at a specified clock time represents a digital first state if the signal level is more positive than a first threshold level or more negative than a lower second threshold level, and represents a digital second state if the signal level is at or near a middle level between said threshold levels, a system for automatically adjusting these first and second threshold levels in proportion to variations in the overall amplitude of said partial-response signal, comprising:

sample and hold means for generating an output signal whose amplitude is proportional to the absolute value of the level of said partial-response signal at said specified clock time when the level of the absolute value of said partial-response signal at said clock time is above a predetermined fraction of the absolute value of the level of said partial respone signal from a prior clock time and for maintaining said output signal at the amplitude generated at a prior clock time when the level of the absolute value of the partial response signal at said specified clock time is below said predetermined fraction of the absolute value of the level of said partial response signal from said prior clock time; and means for generating said first and second threshold levels as a function of said output signal.

* * * * *

UNITED STATES PATENT AND TRADEMARK OFFICE
CERTIFICATE OF CORRECTION

PATENT NO. : 4,399,474
DATED : August 16, 1983
INVENTOR(S) : Charles H. Coleman, Jr.

It is certified that error appears in the above-identified patent and that said Letters Patent are hereby corrected as shown below:

Column 1, line 68, ""1" should read --+1--;
Column 4, line 60, ""1"s"" should read --1's--;
Column 5, line 2, "rectifier 10" should read --rectifier 30--;
Column 5, line 24, "amplitude" should read --amplifier--;
Column 6, line 11, "of" (1st occurr.) should read -if-
Column 7, line 24, "problem" should read --portion--;
Column 8, line 29, "$t_2$is" should read --$t_2$ is--;
Column 9, line 46, "respone" should read --response--;
Column 9, line 58, "singal" should read --signal--;
Column 12, line 22, "respone" should read --response--.

Signed and Sealed this

Second Day of April 1985

[SEAL]

Attest:

DONALD J. QUIGG

Attesting Officer

Acting Commissioner of Patents and Trademarks